United States Patent [19]

Lucas

[11] 3,882,390
[45] May 6, 1975

[54] FLIP-FLOP BALANCE TESTING CIRCUIT
[75] Inventor: James Allen Lucas, Naperville, Ill.
[73] Assignee: Bell Telephone Laboratories, Incorporated, Murray Hill, N.J.
[22] Filed: July 31, 1974
[21] Appl. No.: 493,326

[52] U.S. Cl. .......................... 324/158 R; 324/73 R
[51] Int. Cl. ............................................ G01r 31/28
[58] Field of Search ..................... 324/158 R, 73 R; 235/153 AC

[56] References Cited
OTHER PUBLICATIONS
Catt, I.; "Time Loss..."; IEEE Trans. on Electronic Computers; Feb., 1966; pp. 108–110.
Chaney et al.; "Anomalous Behavior..." IEEE Trans. on Electronic Computers; April, 1973; pp. 421–422.

Primary Examiner—Alfred E. Smith
Assistant Examiner—Ernest F. Karlsen
Attorney, Agent, or Firm—W. H. Kamstra

[57] ABSTRACT

A testing circuit for determining the probability of a cross-coupled flip-flop existing in a balanced state within a predetermined input timing range as the result of critically timed input signals. One of the inputs of the flip-flop under test has applied thereto periodic input signals while the other input has applied input signals the timing of which is caused to vary around the timing of the other input signals. Within this latter timing range, at the perfect "race" point, i.e., when both inputs precisely coincide in time, the flip-flop will be balanced to generate two equal voltage levels somewhere between a logic "1" and "0." The number of balances are counted at a specified balance duration together with the number of trials over the predetermined timing range to achieve sums for computing balance probability at the duration of balance specified.

13 Claims, 2 Drawing Figures

FLIP-FLOP BALANCE TESTING CIRCUIT

BACKGROUND OF THE INVENTION

This invention relates to logic circuitry generally, and particularly to circuits for testing bistable binary storage circuits, providing complementary outputs commonly known as Set-Reset (S-R) flip-flops.

Normally considered a two-state device, an S-R flip-flop is provided with a Set and Reset input and a binary "1" and "0" output terminal. When a trigger signal pulse is applied to the Set input, the circuit is switched to its Set state and a voltage level indicating the storage of a binary "1" appears on the corresponding output terminal. Similarly, when a trigger signal pulse is applied to the Reset input, the circuit switches its state and a voltage level indicating the storage of a binary "0" appears on the corresponding output terminal. As is known, a flip-flop circuit may also be provided with a "toggle" input, the energization of which will reverse the flip-flop state regardless of its initial information content.

As mentioned in the foregoing, ideally a flip-flop is exclusively a two-state device, that is, one and only one binary value will be manifested at its output for a given input. Conditions may arise, however, in a particular logic system such that a flip-flop is triggered by a pair of input signals with critical timing. As a result, the two outputs may simultaneously exhibit voltage levels at a point somewhere between a binary "1" and a binary "0" level. Such a balancing of outputs, it has been found, can exist with a small but nonzero probability for a relatively long period of time compared with a specified logic gate delay. A flip-flop balance condition has been encountered, for example, as the result of a resynchronizing operation in which the flip-flop is employed. Such a resynchronizing operation may be required when a data stream is transmitted through a system to compensate for variations in delay in different paths therethrough. Resynchronization may also be required, for example, for the outputs of mutually asynchronous data processing subsystems. In each case, a flip-flop has been employed for synchronization on the assumption that the circuit would reach a logically defined state within some maximum fixed time period. This assumption, however, has recently been opened to serious question and there is presently no certainty that there exists for a given flip-flop a fixed time interval sufficiently long to ensure its reaching a defined output state.

This uncertainty frequently presents a vexing problem to data processing system designers who presently have no way of predicting a system error rate resulting from balanced flip-flop circuits. Nor at this time are integrated flip-flop circuits commercially available which are specified in terms of their characteristics so as to make possible a prediction of error probability of the circuits as synchronizing elements.

It is accordingly an object of this invention to make possible the prediction of the error probability of a given flip-flop circuit as a synchronizing element.

Another object of this invention is the provision of a test circuit for comparing the frequency with which a flip-flop circuit reaches balanced output states with the number of inputs applied over prescribed variations in its input trigger signals.

Also an object of this invention is the realization of a new and novel circuit means for providing race inputs to a flip-flop circuit.

SUMMARY OF THE INVENTION

The foregoing and other objects of this invention are realized in one specific illustrative embodiment thereof comprising a circuit means for "racing" the two inputs of flip-flop circuit under test, that is, causing both inputs to undergo a "0" to "1" transition at the same time. If the leading edges of the input signals coincide precisely in time, the race is perfect and the flip-flop circuit is balanced, in which case its outputs are substantially equal — and logically undefined. If the race is not perfect, a balance for some finite duration may still occur and, according to this invention, one of the input signals is caused to vary within a range including and centered about the perfect race point. This is accomplished by phase modulating one input signal over an adjustable interval by a low frequency sawtooth waveform by means of a comparator circuit. A balance detector circuit is provided for detecting balanced output states of the flip-flop under test, the latter states being counted by suitable counter means at a specified balance duration over a predetermined input timing range. The number of attempts, that is, the number of race input signals applied to the flip-flop, are also counted over the same timing range by a second counter means. The outputs of both counters are applied to a divide logic arrangement which divides the number of balanced states by the number of attempts to generate a quotient representing the probability of the flip-flop circuit under test attaining a balanced output state for a specified duration during the predetermined input timing range.

It is thus a feature of this invention that the timing of input signals to a flip-flop circuit being tested is continuously varied relative to each other over a predetermined timing range to progressively approach coincidence, include coincidence, and then to pass coincidence, the cycle repeating itself over the timing range. It will be appreciated that, assuming, for example, input signals of a frequency of the order of three megahertz modulated by a one hertz sawtooth wave, extremely close sampling of the flip-flop input timing is made possible.

It is also a feature of this invention that the number of time-varied input signals to a flip-flop circuit are counted and compared with the number of balanced output states of the flip-flop circuit at the desired duration of balance during a predetermined input timing range to determine the probability of the flip-flop circuit reaching a balanced output state for the specified duration during the input timing range.

DESCRIPTION OF THE DRAWING

The foregoing and other objects and features of this invention will be better understood from a consideration of the detailed description of the organization and operation of one specific illustrative embodiment thereof which follows when taken in conjunction with the accompanying drawing in which.

DETAILED DESCRIPTION

Figure 1:
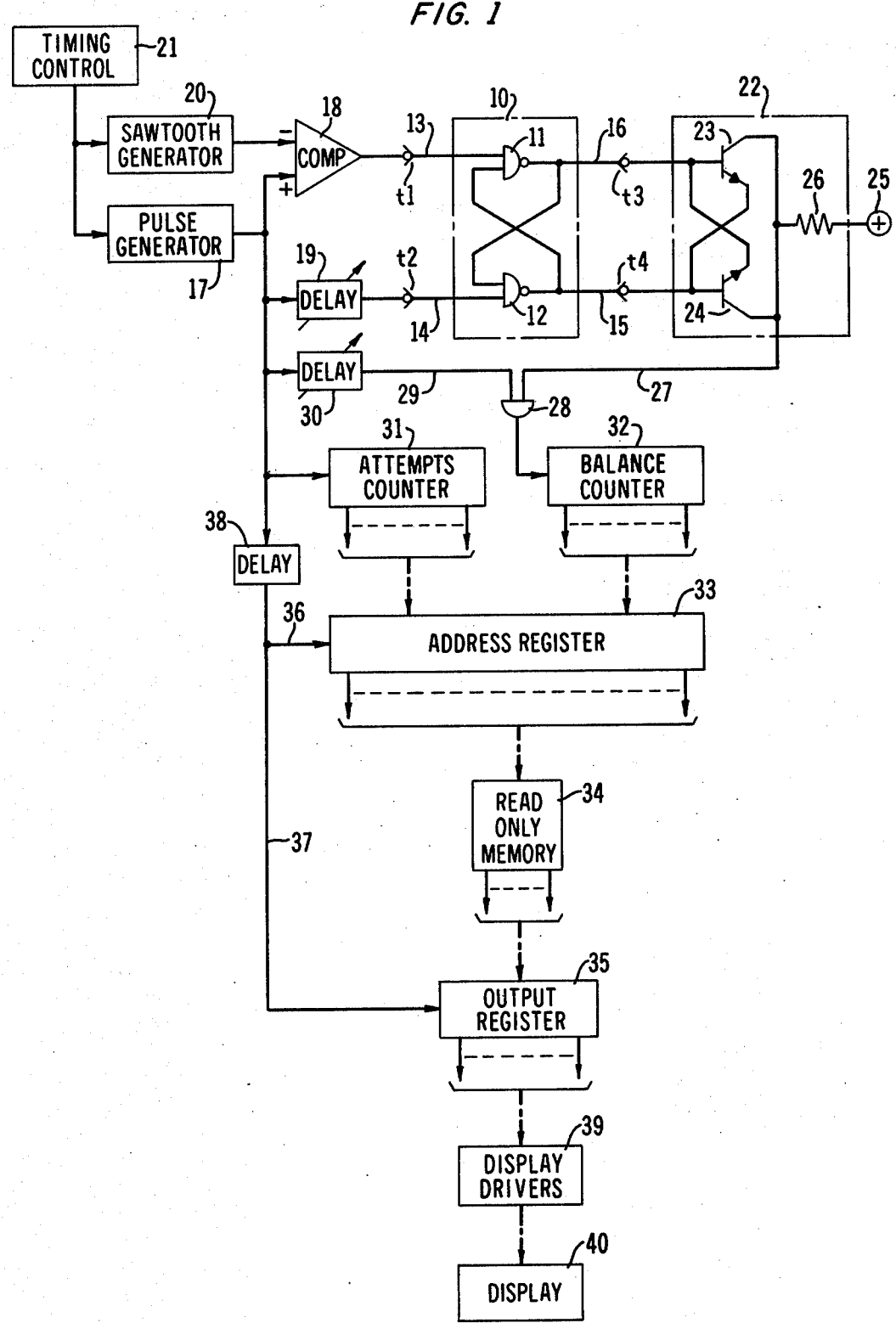
FIG. 1 depicts largely in block symbol form the organization of one illustrative probability testing circuit according to the principles of this invention.

An illustrative testing circuit according to this invention is shown in FIG. 1 as having connected to its test terminals t1, t2, t3, and t4 a flip-flop circuit 10 to be tested for balance probability. A typical flip-flop of the character contemplated herein comprises a pair of NAND gates 11 and 12, each of which has one of its two inputs cross-coupled to the outputs 15 and 16, respectively, of the other gate. The other inputs 13 and 14 of each gate comprise the Set and Reset control of the flip-flop. In accordance with the logic input signal levels applied to the inputs of the flip-flop to control its operation, the latter normally assumes a known discrete output state if one of its inputs has a low level signal applied thereto and remains in that output state until the other input is so controlled. In other words, the binary output state of the flip-flop circuit 10 is determined by which of its inputs 13 and 14 last has a low level logic signal applied thereto. It is the anomalous case in which both inputs 13 and 14 are simultaneously energized, resulting in a balanced output state of the flip-flop outputs 15 and 16, with which this invention is chiefly concerned.

The inputs 13 and 14 are energized during a test operation by trigger pulses which originate in a pulse generator 17, the output of which is applied simultaneously to one input of a comparator circuit 18 and to the input of a variable delay circuit 19. The output of comparator 18 and the output of delay circuit 19 are connected to terminals t1 and t2 and thence to inputs 13 and 14, respectively, of flip-flop 10. A sawtooth waveform generator 20 has its output connected to the other input of comparator 18. The energization of both generator 17 and generator 20 are controlled by a timing control switch 21. Generators 17 and 20 produce signals of a character to be considered in detail hereinafter in connection with a description of an illustrative operation of this invention. The outputs 16 and 15 of flip-flop 10 are connected to test terminals t3 and t4, respectively, which terminals comprise the inputs of a balance detector 22. The latter circuit comprises a pair of NPN transistors 23 and 24 having their bases connected to the terminals t3 and t4, respectively, and their collectors connected together and to a source of positive potential 25 through a resistor 26. The emitter of each of transistors 23 and 24 is connected to the base of the other transistor.

The common collector connection of balance detector 22 also comprises an output point of the latter circuit and this point is connected via a conductor 27 to one input of an AND gate 28. A second input of gate 28 is connected via a conductor 29 and a delay circuit 30 to the output of pulse generator 17. At this point, as will be better understood hereinafter, two signal conditions generated by the test circuit of this invention are employed to control two independent counter circuits. A first counter, an "attempts" counter 31, is controlled by pulses originating at pulse generator 17 and a second counter, a "balance" counter 32, is controlled by the output condition of AND gate 28. Parallel outputs of each of the counters 31 and 32 are applied as parallel inputs to an address register 33. The address register 33 forms the first component of an illustrative divide section of the test circuit of this invention which advantageously generates directly a probability value from data entered into the counters 31 and 32. The register 33 provides access to a read only memory 34 having permanently stored therein data representing every possible quotient of the two sums entered in the counters 31 and 32. A memory of the character assumed for use in connection with this invention is readily envisioned by one skilled in the art and can be made from commercially available parts. One such memory part, an Intel 3304, for example, would be suitable. An output register 35 receives the quotient data from memory 34 and both registers 33 and 35 are read out under the control of pulses originating at the generator 17 via conductors 36 and 37, respectively. A delay circuit 38 is interposed between the registers 33 and 35 and the generator 17 to ensure proper timing of the readouts as will be considered hereinafter. Parallel outputs from register 35 control the operation of a driver circuit 39 which finally controls the numeric display of a probability quotient directly by a display means 40. The latter may conveniently comprise any suitable commercially available digital display unit employing light emitting diodes, for example. As was the case with the generators 17 and 20, the registers, delay circuits, counters, and the like generally referred to in the foregoing, each comprises a standard circuit element well known in the art and need not be described in further detail other than setting forth the functions performed for a complete understanding of this invention. With the foregoing description of the organization of one illustrative test circuit according to this invention in mind, a description of a typical operation thereof may now be considered.

As mentioned in the foregoing, a flip-flop circuit such as the circuit 10 under test is Set when its Set input goes to its low input voltage level and is Reset when its Reset input goes to its low input voltage level. Thus, for example, without assigning Set and Reset functions, assuming that initially input 13 of NAND gate 11 is at its low voltage logic level and input 14 of gate 12 is at its high level, then the output 16 will be high, which condition is applied to the other input of gate 12 to maintain the output 15 at its low output level. The latter level is applied to the other input of gate 11. When the input 14 of gate 12 goes low and the input 13 of gate 11 goes high, the voltage level conditions on the outputs 15 and 16 will be reversed. The normal operation of flip-flop circuit 10 thus presumes clearly defined opposite input voltage levels on the inputs 13 and 14 at the moment the flip-flop is Set or Reset. When these inputs make a low to high transition at, or very near, a given point in time, the output balance states of flip-flop 10 may occur. Such input conditions are simulated by the test circuit of this invention in a manner which may now be described with particular reference to the pulse chart of FIG. 2.

Figure 2:
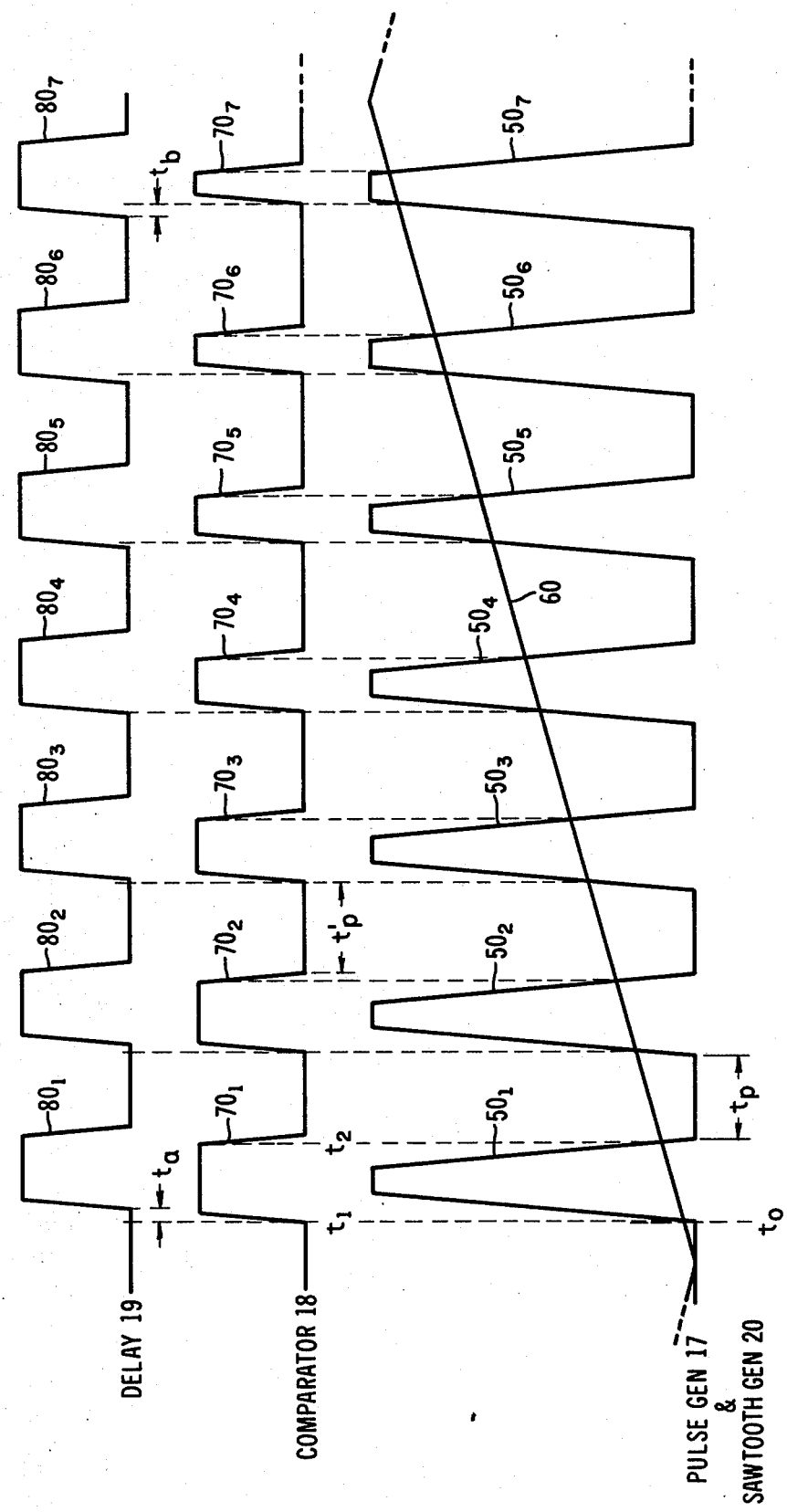
FIG. 2 depicts in idealized form and exaggerated in timing and magnitudes for the sake of clarity, relative input signals applied to the two inputs of a flip-flop circuit under test by the circuit of FIG. 1.

Pulse generator 17 generates periodic pulses which may be controlled with respect to their rise and fall times at a frequency on the order of three megahertz. A sampling of these pulses is depicted in FIG. 2 as waveforms 50. Sawtooth generator 20 produces a substantially sawtooth wave of a frequency on the order of one hertz, a half cycle of which is depicted in FIG. 2 as the waveform 60. The generators 17 and 20 may be controlled by a timing control means 21 which in practice operates to energize the latter components for a predetermined time interval and could comprise, for example, a manually controlled switch. The latter need not synchronize the outputs of generators 17 and 20 for the operation of the circuit of this invention. The signals 50 and 60 are simultaneously applied to the two respective inputs of comparator 18. It will be appreciated that, in view of the vast disparity in the frequencies of the signals 50 and 60, the waveforms thereof are shown in FIG. 2 as extremely exaggerated both in magnitudes and timing in order to demonstrate the principles of this invention. The pulses 50 are also at the same time applied to variable delay circuit 19. In accordance with the operation of comparator 18, the latter initiates the generation of an output at a point in time where the magnitude of pulses 50 exceed that of sawtooth waveform 60 and will continue to generate an output only while this difference in magnitude exists. Thus, pulse $50_1$ applied at time $t_0$ will not cause an output of comparator 18 until time $t_1$ when its leading edge exceeds in magnitude that of waveform 60. Accordingly, at the latter time, comparator 18 initiates an output signal $70_1$ shown in FIG. 2. The output $70_1$ of comparator 18 continues until the trailing edge of pulse $50_1$ falls below the level of waveform 60 indicated at time $t_2$. The comparator 18 will continue to generate output pulses 70 as the pulses 50 are applied thereto separate by a time interval $t_p$. It is important at this point to note that, because of the gradually increasing amplitude of the sawtooth waveform 60 and the sloping trailing and leading edges of the pulses 50, the intersections of these envelopes occur at increasingly longer intervals and cause the generation of output pulses 70 of decreasingly smaller pulse widths. Thus, although the time interval $t_p$ of pulses 50 remain constant, the intervals $t_p'$ of pulses 70 become increasingly longer. These progressive interval and pulse width variations will be reversed on the other half cycle of waveform 60 as the latter decreases in amplitude. The latter half cycle of waveform 60 is not depicted in the drawing.

The output pulses 70 of comparator 18 are thus applied to input 13 of flip-flop 10 at the varying time instants as indicated. The pulses 50 are also applied to variable delay circuit 19 which circuit is operated only to control the timing of its output pulses 80 while the time intervals remain the same as the intervals $t_p$ of pulses 50. More specifically, variable delay circuit 19 is controlled to time the concurrence of a pulse 80 and a pulse 70 substantially at the mid, or quarter cycle point, of the sawtooth waveform 60. The pulse $80_4$ is thus applied to the input 14 of flip-flop 10 at the same time that pulse $70_4$ is applied to input 13 although, as is apparent in the drawing, some appreciable time interval after the original pulse $50_4$ from generator 17. It is also apparent from the drawing that, on one side of the concurrent pulses $70_4$ and $80_4$, the pulses 70 outrun the pulses 80 with gradually decreasing lead time and, on the other side, the pulses 80 outrun the pulses 70 with gradually increasing lead time. These conditions will also reverse on the second half cycle of waveform 60 not specifically depicted in the drawing. Although the amplitude of the pulses 50 has been deliberately exaggerated in the drawing to make possible a graphic demonstration of the relative pulse timing and its control, it is contemplated that the amplitudes of the pulses 50 and 80 are substantially equal.

With the application of pulse $70_1$ to input 13 of flip-flop 10 at time $t_1$, the latter input goes to its high voltage logic level while input 14 remains low as indicated in FIG. 2. As a result, the outputs 15 and 16 are thus at a high and a low voltage state, respectively. Since the base input of transistor 24 of balance detector is now above that of the base of transistor 23, the former conducts through a path including potential source 25, resistor 26, collector and emitter of transistor 24 and to the low voltage of output 16 of flip-flop 10. The output of detector 22 at the collectors of transistors 23 and 24 is thus pulled to a low voltage logic level. (Because of the symmetry of balance detector 22, the output will be low for either logic output state of flip-flop 10.) This low level voltage is applied via conductor 27 to one input of AND gate 28.

Returning to the output generated by the generator 17, pulses 50, these are also employed to control a computation section of the test circuit of this invention as mentioned previously. Thus, the pulses 50 are applied directly to the input of attempts counter 31 to count the number of pulses ultimately applied to the inputs 13 and 14 of flip-flop 10 during a predetermined test interval as controlled by the timing control switch means 21. The number of attempts at achieving a balance of outputs of flip-flop 10 is thus counted by counter 31. Pulse $50_1$ thus stepped counter 31 through a first of its stages. Pulse $50_1$ is also applied to the other input of AND gate 28 via conductor 29 and a variable delay circuit 30. Delay circuit 30 delays pulse $50_1$ such that the test for flip-flop balance is at the desired interval after application of the input pulses 70 and 80, the delay interval also being sufficiently short so that the effect of the trailing edges of the pulses 70 and 80 may be ignored. Since one input to gate 28, that is, the input from balance detector 22, is low, the output of gate 28 remains low and counter 32 is not advanced at this time.

The application of the pulses 70 and 80 to the inputs of flip-flop 10 continues with each pulse application being counted by the counter 31. Flip-flop 10 will operate normally to switch its state in response to the applied input signals until the timing of pulses 70 and 80 approaches simultaneity, as the timing of specific pulses $70_4$ and $80_4$. As the time difference between the pulses 70 and 80 decreases and approaches zero, the probability of flip-flop 10 assuming a balanced output state, even for a very brief time interval, increases. When a balanced output state is reached, both outputs 15 and 16 will be at substantially the same potential and neither transistor 23 nor 24 is caused to conduct. As a result, the output of detector 22 will rise to a potential as determined by source 25 and resistor 26. This high level signal is transmitted to AND gate 28 which will now generate an output upon the application of a delayed pulse 50 from generator 17. The output from gate 28 advances balance counter 32 each time flip-flop 10 assumes a balanced output state in the manner described for a period exceeding the balance duration under test as determined by variable delay 30.

As the pulses 70 and 80 pass the quarter cycle point of sawtooth waveform 60, the difference in timing therebetween progressively increases with the probability of flip-flop 10 assuming a balanced output state decreasing. The specific probability will vary as determined by the individual characteristics of the flip-flop circuit under test. The probability of a flip-flop assumng a balanced output state is generated in absolute values over the predetermined input timing range, $t_a + t_b$, by the computation section of the circuit of this invention as follows. The contents of registers 31 and 32 is transmitted to address register 33 where, based on the combined counter contents, the address of the quotient of the latter is accessed and the quotient is passed on to output register 35. Registers 33 and 35 are strobed also under the control of pulses 50 from generator 17. The latter pulses are delayed by delay circuit 38 sufficiently to prevent readout of address register 33 while counters 31 and 32 are undergoing contents change. The delay time of memory 34 is contemplated to be such that the readout of register 35 is one timing interval behind that of register 33. The contents of output register 35 is employed to control display driver circuits 39 which in turn control the changing of visual display 40. The application of pulses 70 and 80 to flip-flop 10 will continue for a time period as determined by timing control 21 to ensure an adequate number of successes in achieving balanced output states and therefore a fair sampling of the operation of flip-flop 10.

What has been described is considered to be only one illustrative probability testing circuit according to this invention and it is to be understood that various and numerous other arrangements may be devised by one skilled in the art without departing from the spirit and scope of the invention as defined by the accompanying claims.

What is claimed is:

1. An electrical flip-flop balance testing circuit comprising first circuit means for applying a plurality of first input signals to one input of a flip-flop under test at periodic points in time, second circuit means for applying a plurality of second input signals to the other input of said flip-flop at times continuously varying around said periodic points in time, detector circuit means for generating balance signals responsive to equal output signals on the outputs of said flip-flop, first counter circuit means for counting said balance signals during a predetermined time interval for generating a balance sum signal, and second counter means for counting said first input signals during said predetermined time interval for generating an attempt sum signal.

2. An electrical flip-flop balance testing circuit as claimed in claim 1 also comprising circuit means for combining said balance sum signal and said attempt sum signal for generating a balance probability signal.

3. An electrical flip-flop balance testing circuit as claimed in claim 2 in which said second circuit means comprises a comparator circuit having a pair of inputs, first signal generating means for applying a low frequency sawtooth waveform to one of said comparator inputs, and second signal generating means for applying periodic pulses having finite rise and fall times and of a high frequency to the other of said comparator inputs.

4. An electrical test circuit comprising a first and a second pair of terminals adapted to have a pair of inputs and a pair of outputs, respectively, of an electrical flip-flop circuit connected thereto, a first signal source for applying a plurality of first pulses to one terminal of said first pair of terminals at periodic points in time, a second signal source for applying a plurality of second pulses to the other terminal of said first pair of terminals at times coinciding with, and continually varying about, said periodic points in time, a balance detector circuit means for generating balance signals responsive to substantially equal potential conditions on said second pair of terminals, first counter circuit means for counting said first pulses and for generating first data representative of the sum of said first pulses during a predetermined interval, and second counter circuit means for counting said balance signals and for generating second data representative of the sum of said balance signals during said predetermined interval.

5. An electrical test circuit as claimed in claim 4 in which said second signal source comprises a comparator circuit having a first and a second input, said first comparator input also having said plurality of first pulses applied thereto, and a signal generating means for applying a substantially sawtooth waveform to said second comparator input.

6. An electrical test circuit as claimed in claim 5 in which the frequency of said sawtooth waveform is in the one hertz range and the frequency of said plurality of second pulses is in the megahertz range.

7. An electrical test circuit as claimed in claim 5 also comprising circuit means for combining said first data and said second data for generating output data representing the quotient of said sum of said first pulses and said sum of said balance signals.

8. An electrical test circuit as claimed in claim 7 also comprising visual display means operated responsive to said output data for visually presenting said quotient.

9. A circuit for testing the balance operating conditions of a flip-flop having a pair of inputs and a pair of outputs comprising a sawtooth generator for generating a series of pulses at a first frequency, a pulse generator for generating pulses at a substantially higher frequency, a comparator circuit connected to the outputs of both said sawtooth generator and said pulse generator for applying control signals to one of said flip-flop inputs, a delay circuit connected to said pulse generator for applying control signals to the other of said flip-flop inputs, and balance detector circuitry connected to both of the outputs of said flip-flop for generating flip-flop balance signals.

10. A circuit for testing the balance operating conditions of a flip-flop as claimed in claim 9 also comprising a first counter circuit means for counting said balance signals for generating sum balance data.

11. A circuit for testing the balance operating conditions of a flip-flop as claimed in claim 10 also comprising a second counter circuit means for counting said pulses generated by said pulse generator for generating sum attempts data.

12. A circuit for testing the balance operating conditions of a flip-flop as claimed in claim 11 also comprising means for combining said sum balance data and said sum attempts data for generating output signals representing the quotient of said sum balance and attempts data.

13. A circuit for testing the balance operating conditions of a flip-flop as claimed in claim 12 also comprising means operated responsive to said output signals for perceptibly presenting said quotient.

* * * * *